United States Patent [19]
Kahn et al.

[11] 3,772,128
[45] Nov. 13, 1973

[54] MACHINE FOR CONTINUOUSLY PRODUCING LARGE AREA LIGHT POLARIZING PANELS

[75] Inventors: Myron Kahn, Northridge; William R. Werderman, Santa Susana, both of Calif.

[73] Assignee: Polarized Corporation of America, Northridge, Calif.

[22] Filed: Sept. 21, 1970

[21] Appl. No.: 73,847

[52] U.S. Cl.................. 156/555, 156/498, 156/500
[51] Int. Cl........................... B31f 5/00, B32b 31/00
[58] Field of Search.................. 156/244, 555, 500, 156/324, 322, 498

[56] References Cited
UNITED STATES PATENTS

| 3,481,818 | 12/1969 | Wellen | 156/244 |
|---|---|---|---|
| 3,526,000 | 8/1970 | Williams | 156/322 |
| 3,574,019 | 4/1971 | Girard | 156/244 |
| 3,505,147 | 4/1970 | Eulie | 156/322 |
| 2,577,332 | 12/1951 | Kienninger | 156/324 |
| 3,360,415 | 12/1967 | Hellman et al. | 156/324 |
| 3,451,876 | 6/1969 | Edelmann et al. | 156/244 |

Primary Examiner—Douglas J. Drummond
Attorney—Albert F. Kronman

[57] ABSTRACT

A large area light polarizing panel is continuously produced by laminating a layer of a light transmitting foamed cellular plastic material between a self supporting plastic base sheet and a thin plastic cover sheet while the base sheet is hot enough to cause the members to bond together.

4 Claims, 3 Drawing Figures

Patented Nov. 13, 1973

3,772,128

INVENTORS.
MYRON KAHN
WILLIAM R. WERDERMAN

ATTORNEY

MACHINE FOR CONTINUOUSLY PRODUCING LARGE AREA LIGHT POLARIZING PANELS

BACKGROUND OF THE INVENTION

In United States Pat. No. 3,124,639 there was described a light polarizing structure in the form of a sheet of light transmitting foamed cellular plastic material. Such material is extremely flexible and requires that the individual cells be substantially flattened in the plane of the sheet in order to polarize light passing therethrough. In order to incorporate the light polarizing sheet described in the aforesaid patent into a self-supporting panel, such as is used for overhead lighting purposes, it is necessary to secure it to a self supporting sheet. However, the extreme flexibility and fragility of such a polarizing sheet creates many difficulties particularly in a continuous process. The polarizing sheet tends to form large air inclusions or bubbles between the polarizing sheet and the support sheet. If the temperature of the support sheet at the point of lamination is too high the polarizing sheet may melt or the cellular structure may lose its flattened shape, thereby destroying its light polarizing properties.

The present invention makes it possible to secure a light polarizer of the cellular plastic type to a support without destroying the light polarizing efficiency of the structure.

SUMMARY OF THE INVENTION

In one preferred embodiment of the present invention a sheet of a transparent or transluscent plastic material is extruded and carried while relatively hot into the nip of rollers. A continuous web of a foamed cellular plastic light polarizer is led into the same roller nip and the two pressed together. The heat of the extruded plastic causes the two materials to adhere to each other in the absence of any other adhesive. A third or cover layer of a thin transparent or transluscent plastic material is then led between the nip of a second set of rollers into which the first two plastic materials are also led. The residual heat of the extruded plastic causes the cover layer to adhere to the polarizer to form a completed lamination. The laminated materials can then be cut off to any desired length.

DESCRIPTION OF THE DRAWINGS

In the accompanying drawings forming a part hereof.

DESCRIPTION OF THE PREFERRED EMBODIMENT

Figure 1:
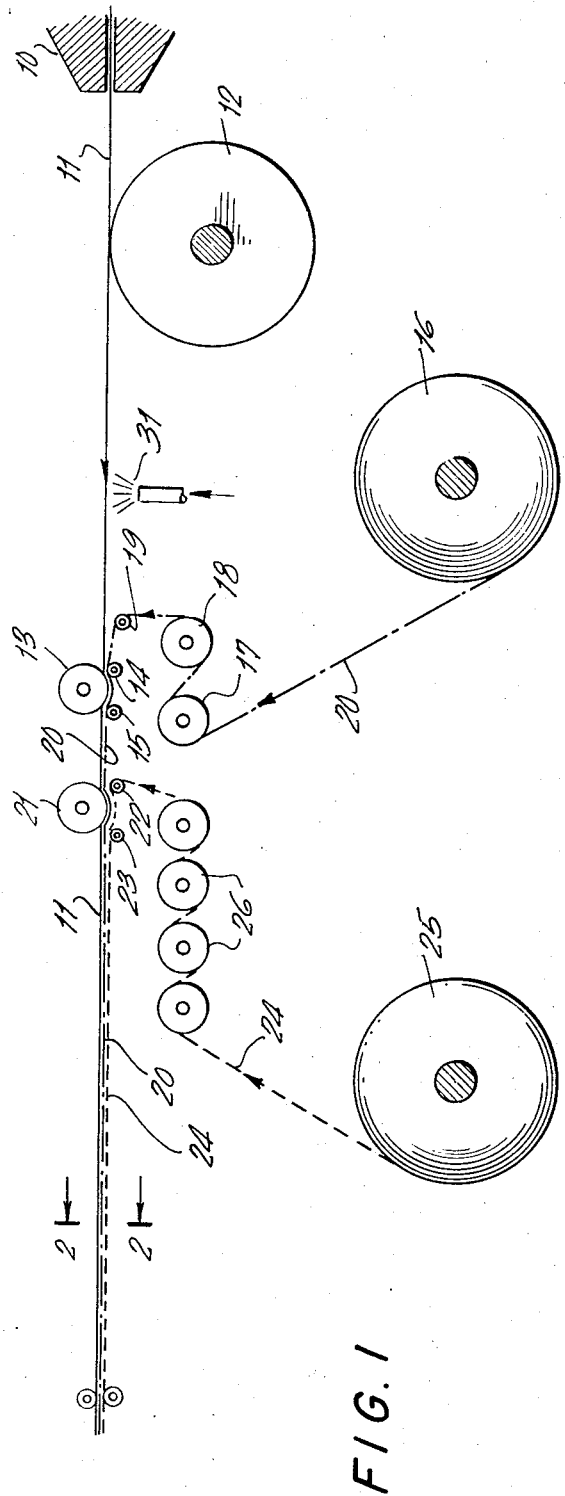
FIG. 1 is a somewhat diagrammatic view in side elevation of a complete embodiment of the present invention.

Referring to FIG. 1, 10 indicates the extrusion die of a plastic extruding machine or the exit end of the calendaring rolls of a plastic calendaring apparatus. The operation of such extruding and calendaring machines is well known in the art and need not be discussed here. A continuous sheet of plastic 11 is emitted from the die 10 and is transported by one or more rollers indicated at 12. The plastic sheet 11 is transported horizontally into the nip of a first set of laminating rollers 13, 14, 15.

The plastic sheet 11 as it emerges from the die 10 is at an elevated temperature. In order to carry out the present invention, the temperature of the sheet 11 as it enters the nip of the first set of laminating rollers 13, 14, 15, is brought down to a critical range of between 200 to 280 degrees F either by watercooling the feed rollers 12 in the well known manner or by applying a blast of cooling air 31 to the sheet of plastic 11 before it reaches the laminating rollers 13, 14, 15.

A layer of light polarizing material made in accordance with United States Pat. No. 3,124,639, and consisting of mass of light transmitting foamed cellular plastic material is led from a supply roll 16, around two tensioning rolls 17, 18, over a let-off roll 19 and into the nip of the laminating rollers 13, 14, 15 beneath the plastic sheet 11. At this juncture, the latent heat within the plastic sheet 11 is sufficient to cause the light polarizing sheet to become adhered thereto without the necessity of introducing adhesives.

Since the light polarizing sheet consists of a very fragile structure of foamed plastic bubbles which must be maintained in a flattened condition, it will be apparent that excessive heat at this point will destroy the light polarizing structure. In addition, it has been found that the let-off roller 19 must be disposed in advance of the laminating rollers 13, 14, 15, and between one-sixteenth and three-eighths of an inch beneath the plastic sheet 11. If the let-off roller 19 is less than one-sixteenth of an inch beneath the plastic sheet 11, the polarizing sheet 20 will become wrinkled as it enters the nip of the first laminating rollers 13 14, 15. On the other hand, if the let-off roller 19 is more than three-eighths of an inch away from the plastic sheet 11, the polarizing sheet 20 tends to tear and bubbling or the inclusion of air spaces between the polarizing sheet 20 and the plastic sheet 11 occurs. In order to eliminate bubbling with the let-off roller more than three-eighths of an inch below the plastic sheet 11, the tension on the polarizing sheet 20 has to be increased to such a level that the geometry of the bubbles within the foamed plastic structure is altered and the light polarizing efficiency of the sheet 20 is reduced.

As the sheet of plastic 11 with the light polarizing sheet 20 adhered thereto leaves the first set of laminating rollers 13, 14, 15, it is led into a second set of laminating rollers 21, 22, 23. At this juncture in the operation, the heat of the plastic sheet 11 has been imparted to the foamed plastic polarizer 20 and is sufficiently great that a cover sheet of plastic 24, which is also fed into the nip of the second set of laminating rollers 21, 22, 23, becomes adhered to the bottom face of the light polarizing sheet 20.

It will be seen that the cover sheet 24 is led from a storage roll 25 over tensioning rollers 26, which are disposed beneath the laminating rollers 21, 22, 23.

Figure 2:
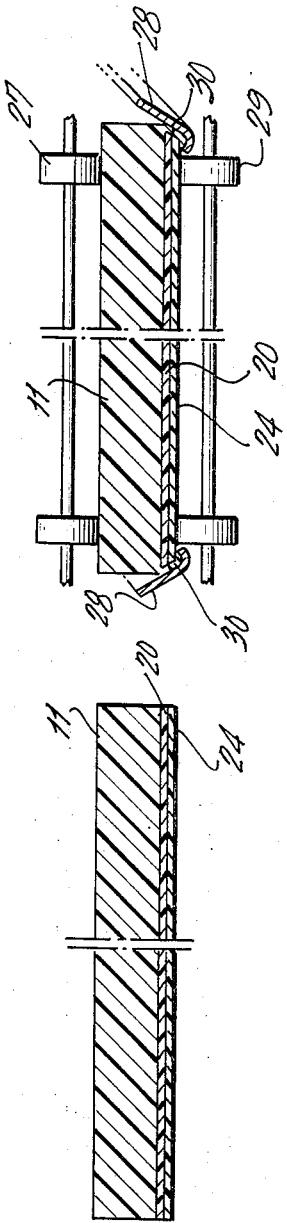
FIG. 2 is a greatly enlarged cross sectional view of the light polarizing panel produced on the machine of FIG. 1 at one stage of its operation.

As the laminated plastic sheets emerge from the second set of laminating rollers, they have the appearance of the assembly shown in FIG. 2. Thereafter, it is desirable to seal the edges of the assembled sheets to prevent separating thereof during use. Accordingly, the assembled sheets are passed between spaced blocks 28. The rollers 27 and 29 support the edges of the lamination, while blocks 28 which are heated blocks cause the edges to melt and turn inwardly as indicated at 30 in FIG. 3.

Figure 3:
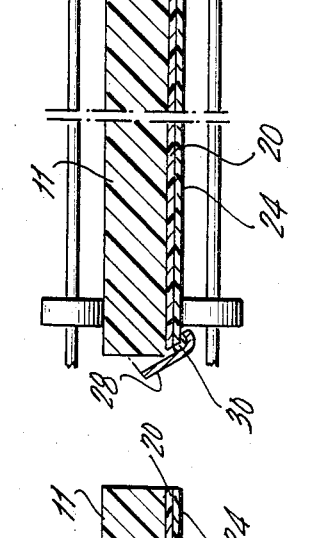
FIG. 3 is a view similar to FIG. 2 showing the finished light polarizing panel made on the machine of FIG. 1.

It will be observed from an examination of FIGS. 2 and 3, that the plastic sheet 11 is of substantial thickness with respect to the light polarizing sheet 20. Upon cooling, the plastic sheet 11 is self supporting and will hold the light polarizing sheet and the cover sheet 24 in such manner that a unitary self supporting panel is produced.

As the finished assembly leaves the machines shown in FIG. 1, the panels can be cut off to any suitable length or configuration.

It will be apparent to those skilled in the art that the plastic sheet 11 may be of any material suitable for lighting applications such as methylmethacrylate, general purpose or light stable polystyrene, vinyls, reinforced polyesters, or the like. The overlay film or cover film can be made of sheets of plastic films such as acrylics, polystyrene, vinyl and the like. In addition, the plastic sheet 11 and the overlay film can be transparent, translucent, embossed, ribbed or of varying thickness without departing from the scope of the present invention.

In one preferred embodiment of the present invention, employing methylmethacrylate plastic sheet 11, a foamed polystyrene light polarizing sheet 20, and an acrylic film overlay sheet 24, the temperature of the plastic sheet 11 as it entered the first laminating rollers 13, 14, 15, was between 200° and 280° F. The temperature of the assembly of the plastic sheet 11 and the foamed plastic polarizer 20 as it entered the second laminating rollers 21, 22, 23, was between 190° and 270° F.

It will also be apparent that edge sealing of the laminated structure can be accomplished by passing the finished assembly through rollers shaped to form a bead on the edge of the panel in lieu of the blocks shown in FIG. 3.

Having thus fully described the invention, what is claimed as new and desired to be secured by Letters Patent of the United States, is:

1. A laminating device for continuously combining an elongated sheet of a self supporting base plastic material, an elongated sheet of a foamed cellular light polarizing plastic material and an elongated cover sheet of plastic material into a unitary structure comprising a source of self supporting base plastic material at an elevated temperature, means to bring the temperature of the said base plastic to within 200°–280°F (a desired range) for self laminating, a source of a foamed cellular light polarizing plastic material, first and second rollers to guide the base plastic and cellular plastic material, a first set of laminating rollers to receive the base plastic and cellular plastic material therebetween, a source of a cover plastic material, a third set of rollers to guide the said cover material, and a second set of laminating rollers to receive the base plastic and cellular plastic material coming from the first set of laminating rollers and the cover plastic material therebetween, whereby the three continuous sheets of plastic are laminated into a self supporting light polarizing member.

2. A device according to claim 1 in which the first set of laminating rollers are watercooled to reduce the temperature of the base plastic.

3. A device according to claim 1 in which the base plastic temperature is reduced by a source of cooling air.

4. A device according to claim 1 in which the second rollers include a let off roller spaced from the surface of the base plastic not less than one-sixteenth of an inch and not more than three-eighths of an inch whereby the cellular plastic material makes a flat angle with the base plastic as the approach the first laminating rollers.

* * * * *